US012748794B1

(12) United States Patent

Waks et al.

(10) Patent No.: US 12,748,794 B1

(45) Date of Patent: Sep. 29, 2026

(54) METHODS FOR HYBRID ENTITY RESOLUTION BLOCKING AND DEVICES THEREOF

(71) Applicant: SKYLINE AI LIMITED, Tel Aviv (IL)

(72) Inventors: Zeev Waks, Ness Ziona (IL); Dotan Davidovich, Herzliya (IL); Yana Volovik, Tel Aviv (IL); Sara Fernandez, Madrid (ES)

(73) Assignee: SKYLINE AI LTD., Tel Aviv (IL)

( * ) Notice: Subject to any disclaimer, the term of this patent is extended or adjusted under 35 U.S.C. 154(b) by 0 days.

(21) Appl. No.: 19/089,299

(22) Filed: Mar. 25, 2025

(51) Int. Cl.
*G06F 7/00* (2006.01)
*G06F 16/334* (2025.01)
*G06F 40/295* (2020.01)

(52) U.S. Cl.
CPC ........ *G06F 16/3347* (2019.01); *G06F 40/295* (2020.01)

(58) Field of Classification Search
CPC ........................... G06F 16/3347; G06F 40/295
See application file for complete search history.

(56) References Cited

U.S. PATENT DOCUMENTS 9,037,589 B2 * 5/2015 Anderson ............... G06F 16/20 707/737
9,996,607 B2 * 6/2018 Alexe ................... G06F 16/256
10,180,969 B2 * 1/2019 Trudel .................. G06F 16/288
11,157,954 B1 * 10/2021 Belanger ............ G06Q 30/0201
11,423,072 B1 * 8/2022 Chen ..................... G06F 18/253
11,921,687 B2 * 3/2024 Wick ..................... G06F 18/231
11,941,065 B1 * 3/2024 Li .......................... G06N 20/00
12,353,441 B1 * 7/2025 Zhao .................... G06F 18/2321
12,511,322 B1 * 12/2025 Zhang ................. G06F 16/3347
12,511,497 B1 * 12/2025 Oks ......................... G06F 40/47
12,519,763 B2 * 1/2026 Laliberte ................ H04L 63/08
(Continued)

OTHER PUBLICATIONS

Balsebre, Pasquale, et al., "Geospatial Entity Resolution," WWW'22, Proceedings of the ACM Web Conference 2022 (WWW'22), Apr. 25-29, 2022, Virtual Event, Lyon, France (2022).
(Continued)

*Primary Examiner* — Mohammed R Uddin

(74) *Attorney, Agent, or Firm* — Troutman Pepper Locke LLP

(57) ABSTRACT

Methods, non-transitory computer readable media, and entity resolution management computing devices that receive a request to identify potentially matching records that include an entity across data sources. Entity resolution is initiated to identify the potentially matching records in response to the received request. The initiated entity resolution comprises: executing a first blocking step to identify a first subset of any potentially matching records that include the entity across the data sources; executing a second blocking step to identify a second subset of any potentially matching records that include the entity across the data sources, where the first blocking step is different from the second blocking step; and generating a master set of potentially matching records from the first subset and the second subset of any potentially matching records. The master set of potentially matching records is provided in response to the received request.

12 Claims, 6 Drawing Sheets

(56) References Cited

U.S. PATENT DOCUMENTS

| | | | | |
|---|---|---|---|---|
| 2008/0319978 | A1* | 12/2008 | Brun | G06F 40/295<br>707/999.005 |
| 2014/0180826 | A1* | 6/2014 | Boal | G06Q 30/0269<br>705/14.66 |
| 2018/0197113 | A1* | 7/2018 | Thomas | G06F 16/951 |
| 2018/0336183 | A1* | 11/2018 | Lee | G06F 40/30 |
| 2020/0097601 | A1* | 3/2020 | Han | G06F 16/36 |
| 2020/0401715 | A1* | 12/2020 | Linton | G06F 40/295 |
| 2022/0245347 | A1* | 8/2022 | Wang | G06V 30/416 |
| 2024/0045896 | A1* | 2/2024 | Saha | G06N 3/042 |
| 2024/0370463 | A1* | 11/2024 | Stiles | G06F 16/285 |
| 2025/0291797 | A1* | 9/2025 | Al-Shehab | G06F 16/24552 |
| 2025/0342765 | A1* | 11/2025 | Moore | G06N 5/022 |

OTHER PUBLICATIONS

Evensen, Adrian, "Entity Resolution—An Introduction," Medium.com (2024).

Thirumuruganathan, Saravanan, et al., "Deep Learning for Blocking in Entity Matching: A Design Space Exploration," Proceedings of the VLDB Endowment, 14(11): 2459-2472 (2021).

* cited by examiner

METHODS FOR HYBRID ENTITY RESOLUTION BLOCKING AND DEVICES THEREOF

FIELD

This technology generally relates to methods and devices for entity resolution and, in particular, methods and devices for hybrid entity resolution with geospatial proximity blocking and embedded feature similarity blocking.

BACKGROUND

Entity resolution, also referred to as record linkage, is the computing process of identifying and matching records that include the same entity across different data sources. This process is crucial in various domains including e-commerce, search, data engineering, and more. Entity resolution typically involves comparing features (also known as attributes or properties) of records, such as cost, dimensions, manufacturer name, and product weight in the case of product matching for shopping applications. The absence of unique identifiers and discrepancies in feature values between entities in different sources often makes entity resolution challenging.

From the computational cost perspective, the pairwise comparison of records, which is a cornerstone of entity resolution, is quadratic in complexity and can result in high computational cost when comparing large data sources, necessitating efficient blocking techniques to reduce the number of pairwise comparisons required. Blocking refers to approaches to reduce the amount of pairwise comparisons needed to perform entity resolution between sources.

SUMMARY

An exemplary method for hybrid entity resolution includes receiving, by a computing device, a request from a client device to identify potentially matching records that include an entity across data sources. Entity resolution is initiated by the computing device to identify the potentially matching records that include the entity across the data sources in response to the received request. The initiated entity resolution further comprises: executing, by the computing device, a first blocking step to identify a first subset of any potentially matching records that include the entity across the data sources; executing, by the computing device, a second blocking step to identify a second subset of any potentially matching records that include the entity across the data sources, wherein the first blocking step is different from the second blocking step; and generating, by the computing device, a master set of the potentially matching records that include the entity from the first subset of any potentially matching records and the second subset of any potentially matching records. The master set of the potentially matching records is provided, by the computing device, to the client device in response to the received request.

An exemplary entity resolution management computing device, comprising memory having programmed instructions stored thereon and one or more processors configured to be capable of executing the stored programmed instructions to receive a request from a client device to identify potentially matching records that include an entity across data sources. Entity resolution is initiated to identify the any potentially matching records that include the entity across the data sources in response to the received request. The initiated entity resolution further comprises: executing a first blocking step to identify a first subset of any potentially matching records that include the entity across the data sources; executing a second blocking step to identify a second subset of any potentially matching records that include the entity across the data sources, wherein the first blocking step is different from the second blocking step; and generating a master set of the potentially matching records that include the entity from the first subset of the potentially matching records and the second subset of the potentially matching records. The master set of the potentially matching records is provided to the client device in response to the received request.

An exemplary non-transitory computer readable medium having stored thereon instructions comprising executable code which when executed by one or more processors, causes the one or more processors to receive a request from a client device to identify potentially matching records that include an entity across data sources. Entity resolution is initiated to identify the potentially matching records that include the entity across the data sources in response to the received request. The initiated entity resolution further comprises: executing a first blocking step to identify a first subset of the potentially matching records that include the entity across the data sources; executing a second blocking step to identify a second subset of the potentially matching records that include the entity across the data sources, wherein the first blocking step is different from the second blocking step; and generating a master set of the potentially matching records that include the entity from the first subset of the potentially matching records and the second subset of the potentially matching records. The master set of the potentially matching records is provided to the client device in response to the received request.

This technology provides a number of advantages including providing methods, non-computer readable media, and computing devices for enhanced hybrid entity resolution. Examples of this technology introduce novel blocking methods and devices for entity resolution, specifically tailored for entities that possess geographical coordinates as well as additional features. In particular, examples of this technology are configured to employ a hybrid approach combining this geospatial proximity blocking with embedded feature similarity blocking to determine a master set which has a reduced number of records for more computational effective and efficient pairwise entity comparisons.

DETAILED DESCRIPTION

An exemplary environment 100 with an entity resolution management computing device 102 is illustrated in FIGS.

1-2. In this example, the environment includes the entity resolution management computing device 102, a plurality of client devices **104(1)-104(*n*), and a plurality of databases 106(1)-106(*n*), 108(1)-108(*n*), and 110(1)-110(*n*)**, and coupled together via one or more communication network(s), although the environment may have other types and/or numbers of other systems, devices or other elements in other configurations. This technology provides a number of advantages including methods, non-transitory computer readable media, and entity resolution management computing devices that provide enhanced hybrid entity resolution.

Figure 1:
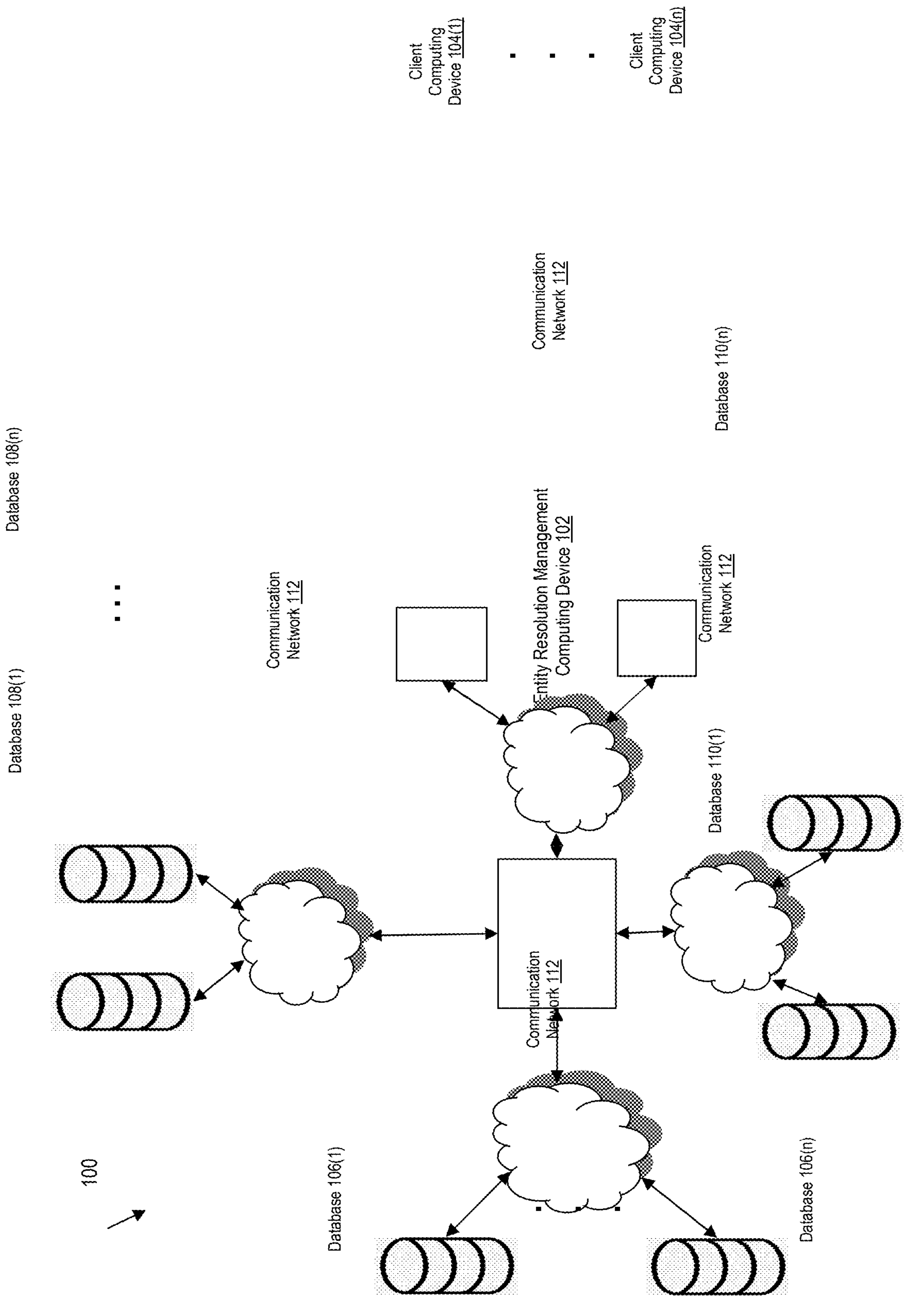
FIG. 1 is a block diagram of an environment with an exemplary entity resolution management computing device.
Figure 2:
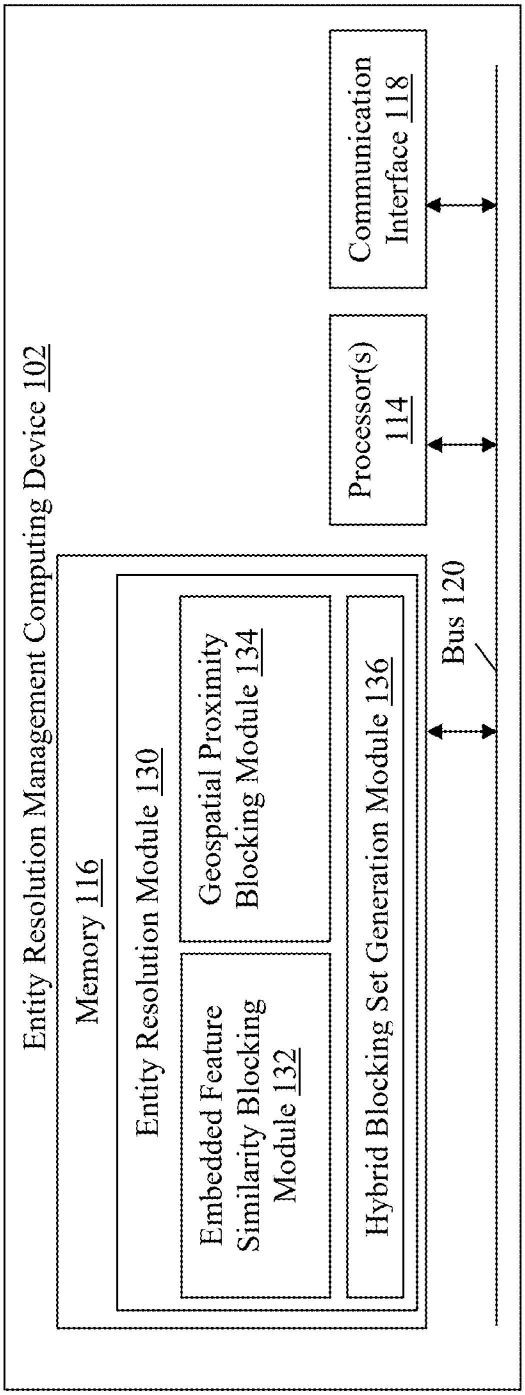
FIG. 2 is a block diagram of the entity resolution management computing device shown in FIG. 1.

Referring to FIGS. 1-2, the entity resolution management computing device 102 may perform any number of functions including hybrid entity resolution with geospatial proximity blocking and embedded feature similarity blocking as illustrated and described by way of the examples herein. The entity resolution management computing device 102 includes one or more processors 114, a memory 116, and a communication interface 118, which are coupled together by a bus or other communication link 120, although the entity resolution management computing device 102 can include other types and/or numbers of elements in other configurations.

The processor(s) 114 of the entity resolution management computing device 102 may execute programmed instructions stored in the memory 116 of the entity resolution management computing device 102 for the any number of the functions identified above. The processor(s) 114 of the entity resolution management computing device 102 may include one or more CPUs or general purpose processors with one or more processing cores, for example, although other types of processor(s) can also be used.

The memory 116 of the entity resolution management computing device 102 stores these programmed instructions for one or more aspects of the present technology as described and illustrated by way of the examples herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 114, can be used for the memory 116.

Accordingly, the memory 116 of the entity resolution management computing device 102 can store one or more applications that can include computer executable instructions that, when executed by the entity resolution management computing device 102, cause the entity resolution management computing device 102 to perform actions, such as hybrid entity resolution with geospatial proximity blocking and embedded feature similarity blocking as described and illustrated below with reference to FIGS. 1-6 by way of the examples as well as other functions, such as to transmit, receive, or otherwise process data and/or messages. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the entity resolution management computing device 102 itself, may be located in virtual server(s) running in a cloud-based computing environment rather than being tied to one or more specific physical network computing devices. Also, the application(s) may be running in one or more virtual machines (VMs) executing on the entity resolution management computing device 102.

In this particular example, the memory 116 of the entity resolution management computing device 102 includes an entity resolution module 130 which includes an embedded feature similarity blocking module 132, a geospatial proximity blocking module 134, and a master block set generation module 136, although the memory 116 can include other types and/or numbers of other modules, databases, or applications, for example.

In this example, the entity resolution module or algorithm 130 comprises programmed instructions to manage the entity resolution operations with the embedded feature similarity blocking module 132, the geospatial proximity blocking module 134, and the master block set generation module 136 as described and illustrated below with reference to FIGS. 3-6 by way of the examples, although the entity resolution module 130 may comprise and manage entity resolution with other types and/or numbers of other blocking or other modules, applications, and/or databases.

The embedded feature similarity blocking module 132 comprises programmed instructions configured for feature embedding similarity blocking, although the module can comprise other types of instructions to facilitate entity resolution and other operations. In this particular example, the embedded feature similarity blocking module 132 comprises programmed instructions configured to embedded features of records stored in one or more of the databases **106(1)-106(*n*), 108(1)-108(*n*), and/or 110(1)-110(*n*) into a vector space, such that rows with similar features are nearby in vector space. For example, word embedding from these records represents words as arrays of numbers (vectors) such that similar words have similar vectors. The distance between these words in vector space reflects how alike the words are in meaning (cat and kitten will be closer in vector space using typical distance metrics than cat and an unrelated word such as volcano). Additionally, the embedded feature similarity blocking module 132** comprises programmed instructions configured to execute a similarity calculation for features associated with an entity. For an entity $E_i$, a subset of similar records $E_{embed}$ is created, comprising records whose embedded feature vector similarity exceeds a predetermined threshold T. The similarity may be calculated using metrics, such as cosine similarity, with a threshold of, for example, of T=0.9.

The geospatial proximity blocking module 134 comprises programmed instructions configured for geospatial proximity blocking, although the module can comprise other types of instructions to facilitate entity resolution and other operations. In this particular example, the geospatial proximity blocking module 132 comprises programmed instructions configured to create for an entity $E_i$, a subset of nearby records $E_{geo}$, containing all records within a distance D that include or otherwise represent $E_i$. The distance D may be set to 100 meters in this example, but may vary based on local conditions for the particular application, such as density in the region.

The master block set generation module 136 comprises programmed instructions configured for master blocking set generation. In this particular example, the geospatial proximity blocking module 132 comprises programmed instructions configured to generate a master blocking set $E_{hybrid}$ by performing a union operation on the record sets from both blocking approaches: $E_{hybrid}:=E_{geo}\cup E_{embed}$, although other types of master block set generation operations could be used. For example, the master block set generation could comprise generating the master set of the potentially matching records that include the entity from an intersection where the first subset of any potentially matching records matches the second subset of any potentially matching records to provide a more refined set that would further accelerate computational costs. Accordingly, the master block set result or final blocking result is produced by creating a list of entity pairs for the entity that underwent blocking. For an entity Ei and its corresponding master blocking set $E_{hybrid}$={E1, E2, . . . , En}, a set of entity pairs P={Ei-E1, $E_i$-E2, . . . , Ei-En} is generated in this example.

The communication interface 118 of the entity resolution management computing device 102 operatively couples and communicates between the entity resolution management computing device 102 and the plurality of client devices **104(1)-104(*n*), and a plurality of databases 106(1)-106(*n*), 108(1)-108(*n*), and 110(1)-110(*n*), which are all coupled together by the communication network(s) 112**, although other types and/or numbers of communication networks or systems with other types and/or numbers of connections and/or configurations to other devices and/or elements can also be used.

By way of example only, the communication network(s) 112 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 112 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

While the entity resolution management computing device 102 is illustrated in this example as including a single device, the entity resolution management computing device 102 in other examples can include a plurality of devices or blades each having one or more processors (each processor with one or more processing cores) that implement one or more steps of this technology. In these examples, one or more of the devices can have a dedicated communication interface 118 or memory 116. Alternatively, one or more of the devices can utilize the memory 116, communication interface 118, or other hardware or software components of one or more other devices included in the entity resolution management computing device 102.

Additionally, one or more of the devices that together comprise the entity resolution management computing device 102 in other examples can be standalone devices or integrated with one or more other devices or apparatuses, such as one of the server devices, for example. Moreover, one or more of the devices of the entity resolution management computing device 102 in these examples can be in a same or a different communication network including one or more public, private, or cloud networks, for example.

The client devices **104(1)-104(*n*) in this example include any type of computing device, such as mobile computing devices, desktop computing devices, laptop computing devices, tablet computing devices, virtual machines (including cloud-based computers), or the like. Each of the client devices 104(1)-104(*n*)** in this example includes a processor, a memory, and a communication interface, which are coupled together by a bus or other communication link, although other numbers and/or types of network devices could be used.

The client devices **104(1)-104(*n*) may run interface applications, such as standard Web browsers or standalone client applications, which may provide an interface to make requests for, and receive content stored on, one or more of the server devices via the communication network(s). The client devices 104(1)-104(*n*)** may further include a display device, such as a display screen or touchscreen, and/or an input device, such as a keyboard for example.

Each of the plurality of databases **106(1)-106(*n*), 108(1)-108(*n*), and 110(1)-110(*n*) in this example may include a processor, a memory, and a communication interface, which are coupled together by a bus or other communication link, although other numbers and/or types of network devices could be used. The plurality of client devices 104(1)-104(*n*), and a plurality of databases 106(1)-106(*n*), 108(1)-108(*n*), and 110(1)-110(*n*) in this example store different types of data related to entities. In these examples, the data sources comprise the databases 106(1)-106(*n*), databases 108(1)-108(*n*), and databases 110(1)-110(*n*)**, although other types and/or numbers of data sources with relevant records for the particular application may be used.

Although the exemplary system with the entity resolution management computing device 102, the client devices **104(1)-104(*n*), the databases 106(1)-106(*n*), 108(1)-108(*n*), and 110(1)-110(*n*) and communication network(s) 112** are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the entity resolution management computing device 102, the client devices **104(1)-104(*n*), the databases 106(1)-106(*n*), 108(1)-108(*n*), and 110(1)-110(*n*) may operate on the same physical device rather than as separate devices communicating through communication network(s). Additionally, there may be more or fewer entity resolution management computing device 102, the client devices 104(1)-104(*n*), the databases 106(1)-106(*n*), 108(1)-108(*n*), and 110(1)-110(*n*) than illustrated in FIG. 1. The client devices 104(1)-104(*n*) could also be implemented as applications on the entity resolution management computing device 102** itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
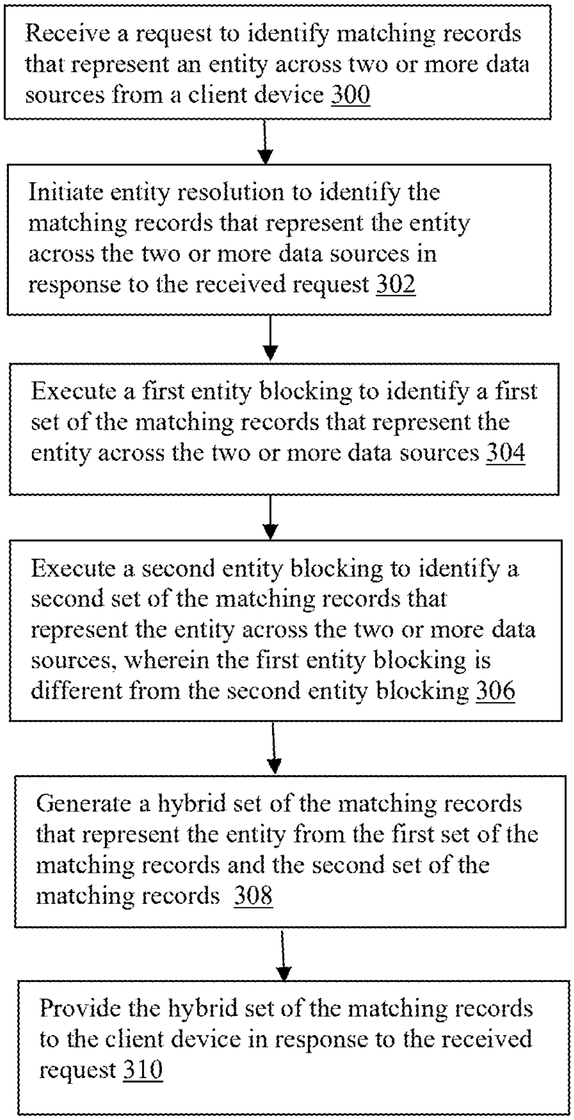
FIG. 3 is a flowchart of an exemplary method for hybrid entity resolution with geospatial proximity blocking and embedded feature similarity blocking.
Figure 4:
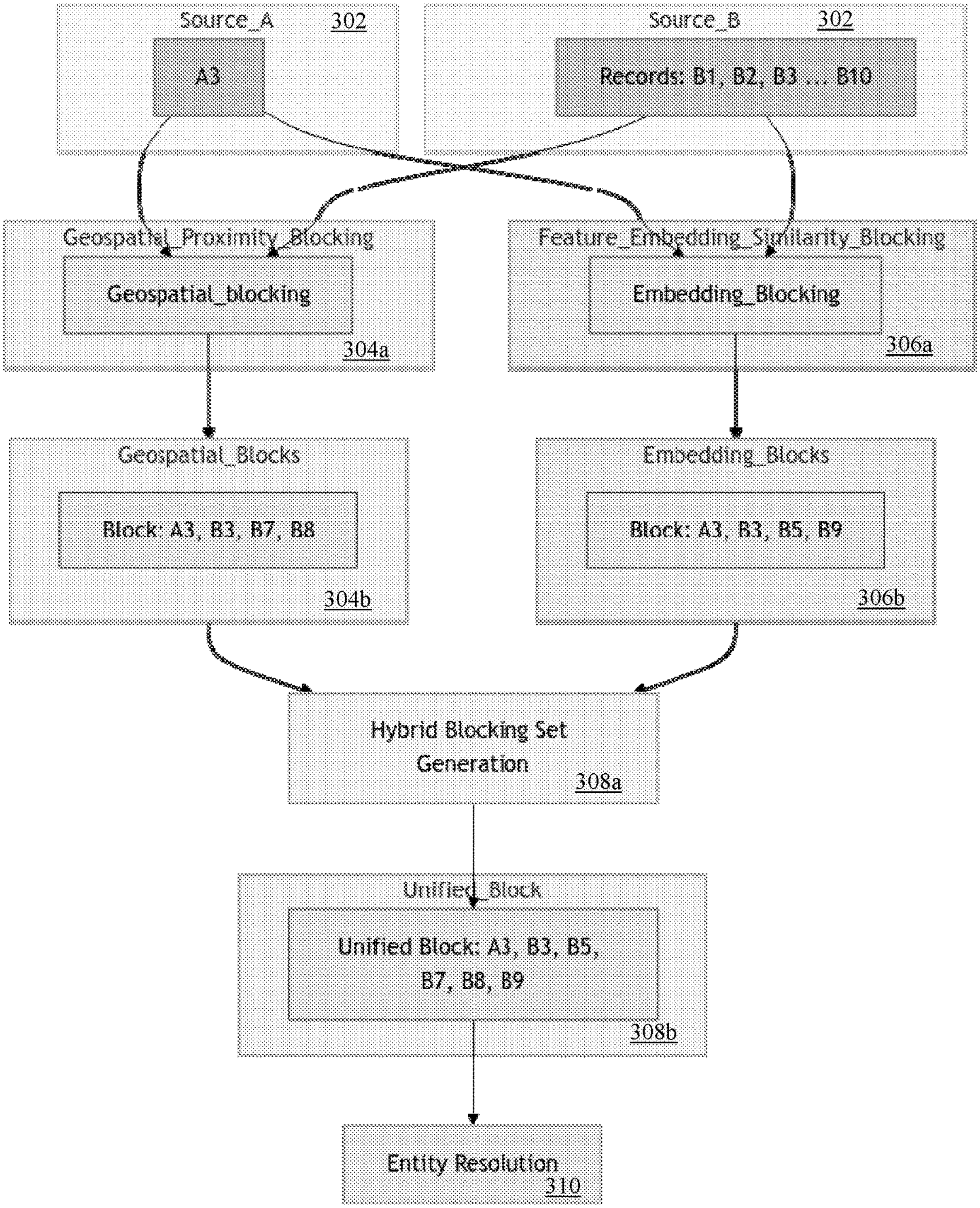
FIG. 4 is a functional block of the exemplary method for hybrid entity resolution with geospatial proximity blocking and embedded feature similarity blocking.
Figure 5:
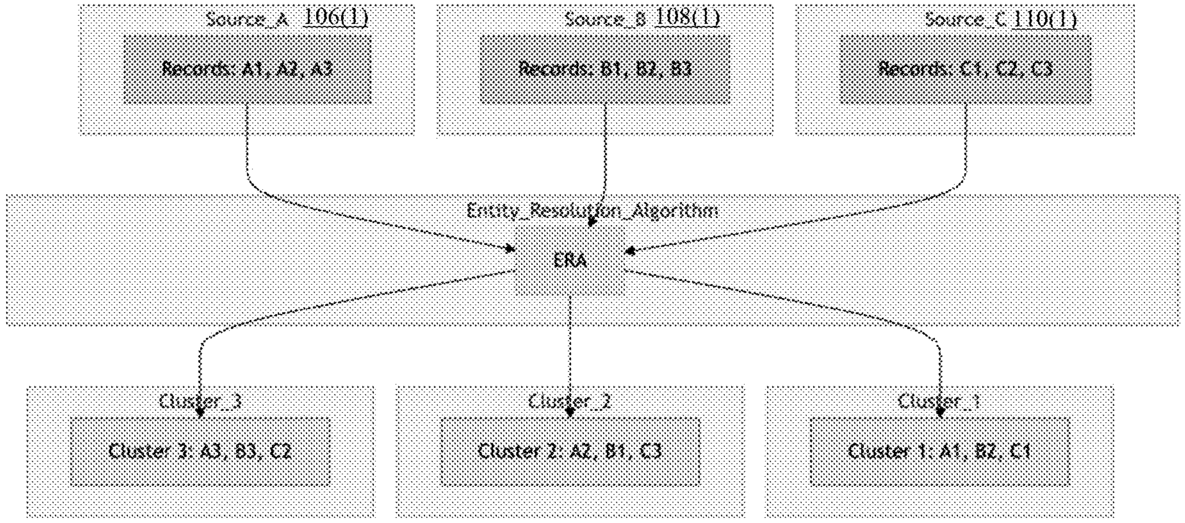
FIG. 5 is a functional block of an example of hybrid entity resolution.

An exemplary method for hybrid entity resolution blocking of entities with geographical coordinates utilizing geospatial proximity and embedded feature similarity will now be described with reference to FIGS. 1-6. Referring more specifically to FIGS. 3-4, in step 300 in this example, the entity resolution management computing device 102 may receive a request to identify potentially matching records that include an entity across data sources, such as the databases 106(1)-106(*n*), 108(1)-108(*n*), and/or 110(1)-110(*n*) by way of example, from one of the client devices 104(1)-104(*n*), although this method could be initiated in other manners.

In step 302, in response to the received request from one of the client devices 104(1)-104(*n*) in this example, the entity resolution management computing device 102 may initiate entity resolution to identify the potentially matching records that include the entity across data sources, such as the databases 106(1)-106(*n*), 108(1)-108(*n*), and/or 110(1)-110(*n*) by way of example. Records from the data sources, such as the databases 106(1)-106(*n*), 108(1)-108(*n*), and/or 110(1)-110(*n*) by way of example, is collected and goes through an entity resolution module 130 to cluster all identical records into the same canonical entities (in this case Cluster_1, Cluster_2, and Cluster_3) as shown in FIG. 4 and as further illustrated and described in greater detail by way of examples herein. For example, as shown in FIG. 4, one of the databases 106(1)-106(*n*), 108(1)-108(*n*), and/or 110(1)-110(*n*) may comprise Source A with a Record A3 and another one of the databases 106(1)-106(*n*), 108(1)-108(*n*), and/or 110(1)-110(*n*) may comprise Source B with Records B1-B10.

Figure 6:
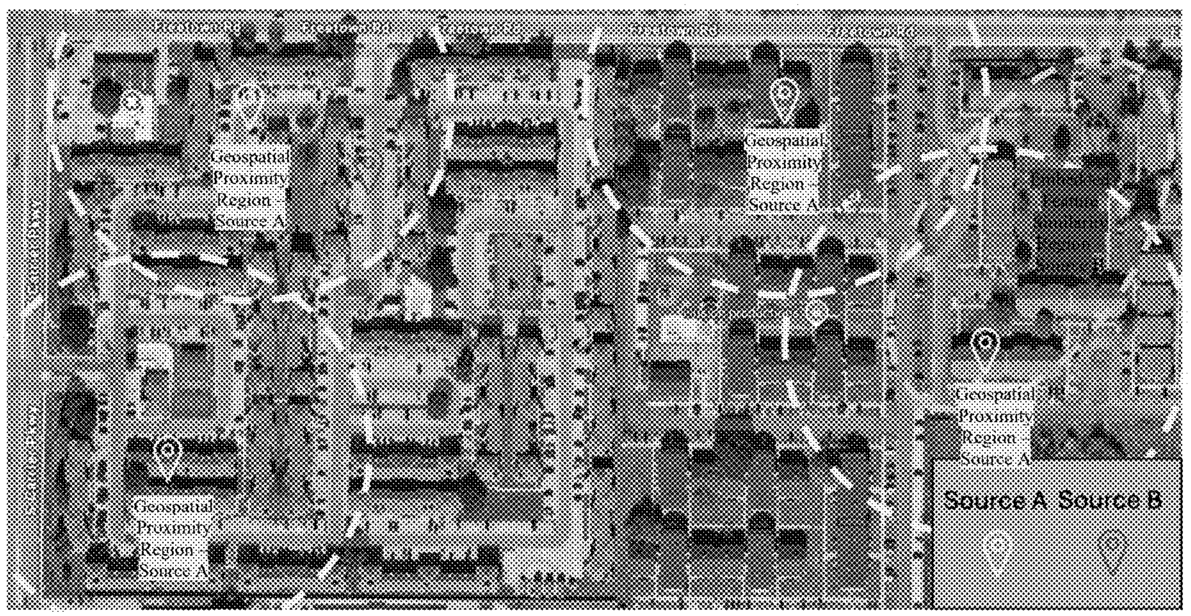
FIG. 6 is a screenshot of an exemplary mapped environment associated with records illustrating different examples of scopes of entity resolution.

In steps 304*a* and 304*b* the entity resolution management computing device 102 executes a first blocking step to identify a first subset of any potentially matching records that include the entity across the data sources, such as the databases 106(1)-106(*n*), 108(1)-108(*n*), and/or 110(1)-110(*n*) by way of example. In this particular example, the first blocking step comprises geospatial proximity blocking, although other types of blocking operations could be performed in other examples. In this particular example, the geospatial proximity blocking module 132 executes programmed instructions to create for an entity Ei, a subset of nearby records $E_{geo}$, containing all records within a distance D that include Ei. The distance D may be set to 100 meters in this example, but may vary based on local conditions for the particular application, such as density in the region. An example of geographical proximity blocking which uses a fixed radius is shown in FIG. 6 with the four circular regions of geographic proximity blocking using a fixed radial distance illustrated. For example, as shown in FIG. 4, the first blocking step may identify potentially matching first subset records A3, B3, B7, and B8 for the entity.

In steps 306*a* and 306*b* the entity resolution management computing device 102 executes a second blocking step to identify a second subset of any potentially matching records that include the entity across the data sources, such as the databases 106(1)-106(*n*), 108(1)-108(*n*), and/or 110(1)-110(*n*) by way of example. In this particular example, the second blocking step comprises feature embedding similarity blocking, although other types of entity blocking operations could be performed in other examples. In this particular example, the embedded feature similarity blocking module 132 comprises programmed instructions configured to embedded features of records stored in one or more of the databases 106(1)-106(*n*), 108(1)-108(*n*), and/or 110(1)-110(*n*) into a vector space, such that rows with similar features are nearby in vector space. For example, word embedding from these records represents words as arrays of numbers (vectors) such that similar words have similar vectors. The distance between these words in vector space reflects how alike the words are in meaning (cat and kitten will be closer in vector space using typical distance metrics than cat and an unrelated word such as volcano). Additionally, the embedded feature similarity blocking module 132 comprises programmed instructions configured to execute a similarity calculation for features associated with an entity. For an entity $E_i$, a subset of similar records Embed is created, comprising records whose feature vector similarity exceeds a predetermined threshold T. The similarity may be calculated using metrics, such as cosine similarity, with a threshold of, for example, of T=0.9. An example of embedded feature similarity blocking is shown in FIG. 6 with the ellipse shaped region illustrated which would capture a record that might otherwise be excluded by just using the geographic proximity blocking or would require the radius of the geographic proximity blocking to be expanded which would result in additional time and computational costs that could be avoid with examples of this technology. For example as shown in FIG. 4, the second blocking step may identify a potentially matching second subset of records A3, B3, B5, and B9 for the entity.

In steps 308*a* and 308*b*, the entity resolution management computing device 102 is configured to generate a master set of the potentially matching records that include the entity from the first subset of any potentially matching records and the second subset of any potentially matching records. In this example the master blocking set generation comprises generating the master set of the potentially matching records that include the entity based on a union operation on the first subset of any potentially matching records and the second subset of any potentially matching records from both blocking approaches: $E_{hybrid}{:=}E_{geo}\cup E_{embed}$, although other types of operations to combine the subsets could be performed. By way of example, the master set of the potentially matching records that include the entity could be generated from an intersection where the first subset of any potentially matching records matches the second subset of any potentially matching records which would produce a more refined set that would further reduce computational time and costs that may be beneficial in some applications. For example as shown in FIG. 4 the entity resolution management computing device 102 may generate a master set of potentially matching records for the entity from the first subset of potentially matching records A3, B3, B7, and B8 and the second subset of potentially matching records A3, B3, B5, and B9 to form the master set of potentially matching records A3, B3, B5, B7, B8, and B9 for the entity, although other operations may be performed to generate the master set, such as only an intersection of the first and second subsets by way of example only.

In step 310 the entity resolution management computing device 102 is configured to provide the master set of the potentially matching records to the client device in response to the received request, although other types of operations could be performed, such as executing further entity resolution operations on the potentially matching records. In this particular example, the final blocking result is produced by creating a list of record pairs for the entity that underwent blocking. For an entity $E_i$ and its corresponding master blocking set $E_{hybrid}$={E1, E2, . . . , En}, a set of entity pairs P={Ei-E1, $E_i$-E2, . . . , $E_i$-En} is generated. In other examples, the entity resolution management computing device 102 may further be configured to execute pairwise entity comparisons based on the master set of the potentially matching records to determine actual matching records for the entity which can be provided to the client device in response to the received request.

Accordingly, as illustrated and described by way of the examples herein, examples of this technology provided enhanced hybrid entity resolution. In particular, examples of this technology are configured to employ a hybrid approach combining this geospatial proximity blocking with embedded feature similarity blocking to determine a master set for more computational effective and efficient pairwise entity comparisons. Each of these individual blocking approach may have weaknesses. For example, inaccurate or missing data can lead two entities to appear far away (and thus not pass geospatial blocking) or dissimilar in features space. However, by combining geospatial proximity of entities with geographic coordinates and feature similarity, examples of this technology provide a more robust mechanism that includes more potentially relevant pairs compared to single criterion blocking techniques and can thus lead to improved entity resolution results.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for hybrid entity resolution, the method comprising:

receiving, by a computing device, a request from a client device to identify potentially matching records that include an entity across data sources;

initiating, by the computing device, entity resolution to identify the potentially matching records that include the entity across the data sources in response to the received request, wherein the entity possesses geographical coordinates and one or more data features, and wherein the initiated entity resolution further comprises:

executing, by the computing device, a first blocking step comprising geospatial proximity blocking which utilizes the geographical coordinates of the entity to identify a first subset of the any potentially matching records that include the entity across the data sources;

executing, by the computing device, a second blocking step comprising embedded feature similarity blocking to identify a second subset of the any potentially matching records that include the entity across the data sources, wherein the first blocking step is different from the second blocking step; and wherein the embedded feature similarity blocking further comprises:

embedding features of the records in the data sources into a vector space, such that rows with the features which are similar are nearby in the vector space; and identifying the second subset of any potentially matching records that include the entity based on the records in the data sources whose feature vector similarity exceeds a set threshold; and employing, by the computing device, a hybrid approach that generates a hybrid blocking set from the geospatial proximity blocking with the embedded feature similarity blocking, wherein the hybrid approach further comprises generating, by the computing device, a unified blocking set that forms a master set of the potentially matching records that include the entity from the first subset of any potentially matching records and the second subset of any potentially matching records;

providing, by the computing device, the master set of the potentially matching records to the client device in response to the received request.

2. The method of claim 1, wherein the entity possesses one or more data features and the geospatial proximity blocking further utilizes the one or more data features with the geographical coordinates of the entity to identify the first subset of any potentially matching records that include the entity across the data sources.

3. The method of claim 1, wherein the generating, by the computing device, the master set of the potentially matching records that include the entity further comprises generating, by the computing device, the master set of potentially matching records that include the entity based on a union of the first subset of any potentially matching records and the second subset of any potentially matching records.

4. The method of claim 1, wherein the generating, by the computing device, the master set of the potentially matching records that include the entity further comprises generating, by the computing device, the master set of potentially matching records that include the entity from an intersection where the first subset of any potentially matching records matches the second subset of any potentially matching records.

5. An entity resolution management computing device, comprising memory comprising programmed instructions stored thereon and one or more processors configured to be capable of executing the stored programmed instructions to:

receive a request from a client device to identify potentially matching records that include an entity across data sources;

initiate entity resolution to identify the potentially matching records that include the entity across the data sources in response to the received request, wherein the entity possesses geographical coordinates and one or more data features, and wherein the initiated entity resolution further comprises:

execute a first blocking step comprising geospatial proximity blocking which utilizes the geographical coordinates of the entity to identify a first subset of any potentially matching records that include the entity across the data sources; and execute a second blocking step comprising embedded feature similarity blocking to identify a second subset of any potentially matching records that include the entity across the data sources, wherein the first blocking step is different from the second blocking step;

wherein the embedded feature similarity blocking further comprises:

embed features of the records in the data sources into a vector space, such that rows with the features which are similar are nearby in the vector space; and identify the second subset of any potentially matching records that include the entity based on the records in the data sources whose feature vector similarity exceeds a set threshold;

employ, by the computing device, a hybrid approach that generates a hybrid blocking set from the geospatial proximity blocking with the embedded feature similarity blocking, wherein the hybrid approach further comprises generate, by the computing device, a unified blocking set that forms a master set of the potentially matching records that include the entity from the first subset of any potentially matching records and the second subset of any potentially matching records;

provide the master set of potentially matching records to the client device in response to the received request.

6. The entity resolution management computing device of claim 5, wherein the entity possesses one or more data features and the geospatial proximity blocking further utilizes the one or more data features with the geographical coordinates of the entity to identify the first subset of any potentially matching records that include the entity across the data sources.

7. The entity resolution management computing device of claim 5, wherein the generate the master set of any potentially matching records that include the entity further comprises generate the master set of any potentially matching records that include the entity based on a union of the first subset of any potentially matching records and the second subset of any potentially matching records.

8. The entity resolution management computing device of claim 5, wherein the generate the master set of the potentially matching records that include the entity further comprises generate the master set of the potentially matching records that include the entity from an intersection where the first subset of any potentially matching records matches the second subset of any potentially matching records.

9. A non-transitory computer readable medium having stored thereon instructions comprising executable code which when executed by one or more processors, causes the one or more processors to:

receive a request from a client device to identify potentially matching records that include an entity across data sources;

initiate entity resolution to identify the potentially matching records that include the entity across the data sources in response to the received request, wherein the entity possesses geographical coordinates and one or more data features, and wherein the initiated entity resolution further comprises:

execute a first blocking step comprising geospatial proximity blocking which utilizes the geographical coordinates of the entity to identify a first subset of the any potentially matching records that include the entity across the data sources; and execute a second blocking step comprising embedded feature similarity blocking to identify a second subset of the any potentially matching records that include the entity across the data sources, wherein the first blocking step is different from the second blocking step;

wherein the embedded feature similarity blocking further comprises:

embed features of the records in the data sources into a vector space, such that rows with the features which are similar are nearby in the vector space; and identify the second subset of the potentially matching records that include the entity based on the records in the data sources whose feature vector similarity exceeds a set threshold;

employ, by the computing device, a hybrid approach that generates a hybrid blocking set from the geospatial proximity blocking with the embedded feature similarity blocking, wherein the hybrid approach further comprises generate, by the computing device, a unified blocking set that forms a master set of the potentially matching records that include the entity from the first subset of any potentially matching records and the second subset of any potentially matching records;

provide the master set of the potentially matching records to the client device in response to the received request.

10. The non-transitory computer readable medium of claim 3, wherein the entity possesses one or more property data features and the geospatial proximity blocking further utilizes the one or more property data features with the geographical coordinates of the entity to identify the first subset of the potentially matching records that may include the entity across the data sources.

11. The non-transitory computer readable medium of claim 9, wherein the generate the master set of the potentially matching records that include the entity further comprises generate the master set of the potentially matching records that include the entity based on a union of the first subset of any potentially matching records and the second subset of any potentially matching records.

12. The non-transitory computer readable medium of claim 9, wherein the generate the master set of the potentially matching records that include the entity further comprises generate the master set of the potentially matching records that include the entity from an intersection where the first subset of any potentially matching records matches the second subset of any potentially matching records.

* * * * *